(12) United States Patent
Ichiba et al.

(10) Patent No.: US 11,809,320 B2
(45) Date of Patent: *Nov. 7, 2023

(54) MEMORY SYSTEM CACHING MAPPING INFORMATION

(71) Applicant: KIOXIA CORPORATION, Tokyo (JP)

(72) Inventors: Fuyuki Ichiba, Tokyo (JP); Takafumi Fujita, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,112

(22) Filed: Feb. 24, 2022

(65) Prior Publication Data

US 2023/0043727 A1   Feb. 9, 2023

(30) Foreign Application Priority Data

Aug. 6, 2021   (JP) ................................. 2021-130038

(51) Int. Cl.
   *G06F 12/08* (2016.01)
   *G06F 12/0815* (2016.01)
   *G06F 12/02* (2006.01)
   *G06F 3/06* (2006.01)

(52) U.S. Cl.
   CPC .......... *G06F 12/0815* (2013.01); *G06F 3/064* (2013.01); *G06F 3/0611* (2013.01); *G06F 3/0679* (2013.01); *G06F 12/0246* (2013.01)

(58) Field of Classification Search
   None
   See application file for complete search history.

(56) References Cited

U.S. PATENT DOCUMENTS

| | | | |
|---|---|---|---|
| 9,274,951 B2 | 3/2016 | Evans et al. | |
| 2014/0359219 A1 | 12/2014 | Evans et al. | |
| 2020/0285585 A1 | 9/2020 | Oikawa | |
| 2020/0349091 A1 | 11/2020 | Appu et al. | |
| 2021/0294740 A1* | 9/2021 | Nagaoka | G06F 12/0246 |
| 2022/0292017 A1* | 9/2022 | Symons | G06F 12/0871 |

* cited by examiner

*Primary Examiner* — Kevin Verbrugge
(74) *Attorney, Agent, or Firm* — Kim & Stewart LLP

(57) ABSTRACT

A memory system is configured to be connected to a host. The memory system includes a non-volatile first memory, a second memory, and a controller configured to manage cache data stored in the second memory in units of a segment such that each segment includes a plurality of pieces of the cache data. Each of the plurality of pieces of the cache data includes mapping information which correlates a logical address value indicating a location in a logical address space provided by the memory system to the host with a location in the first memory. At least two pieces of the cache data are arranged in one segment without a space therebetween.

20 Claims, 9 Drawing Sheets

MEMORY SYSTEM CACHING MAPPING INFORMATION

CROSS-REFERENCE TO RELATED APPLICATION

This application is based upon and claims the benefit of priority from Japanese Patent Application No. 2021-130038, filed Aug. 6, 2021, the entire contents of which are incorporated herein by reference.

FIELD

Embodiments described herein relate generally to a memory system.

BACKGROUND

A memory system with a non-volatile memory is known. The non-volatile memory is, for example, a NAND type flash memory.

The memory system stores address translation information related to a plurality of addresses in a non-volatile memory as a look-up table (LUT). The address translation information is information that correlates a logical address indicating a location in a logical address space with a physical address indicating a location in the non-volatile memory.

The memory system needs the address translation information when translating a logical address into a physical address. However, since access speed with respect to the non-volatile memory is not so fast, the time required for the address translation processing increases when trying to acquire the address translation information from the non-volatile memory. Accordingly, the memory system is provided with a cache memory that can be accessed at a higher speed than the non-volatile memory so that the address translation information can be acquired faster. During the operation of the memory system, a portion of the address translation information is stored in the cache memory as cache data.

DETAILED DESCRIPTION

Embodiments provide a memory system capable of efficiently caching address translation information.

In general, according to one embodiment, a memory system is configured to be connected to a host. The memory system includes a first memory that is a non-volatile memory, a second memory, and a controller. The controller is configured to manage cache data stored in the second memory in units of a segment such that each segment includes a plurality of pieces of the cache data. Each of the plurality of pieces of the cache data includes mapping information which correlates a logical address value indicating a location in a logical address space provided by the memory system to the host with a location in the first memory. At least two pieces of the cache data are arranged in one segment without a space therebetween.

The memory system according to the embodiment will be described in detail with reference to the accompanying drawings below. The scope of the present disclosure is not limited to these embodiments.

First Embodiment

Figure 1:
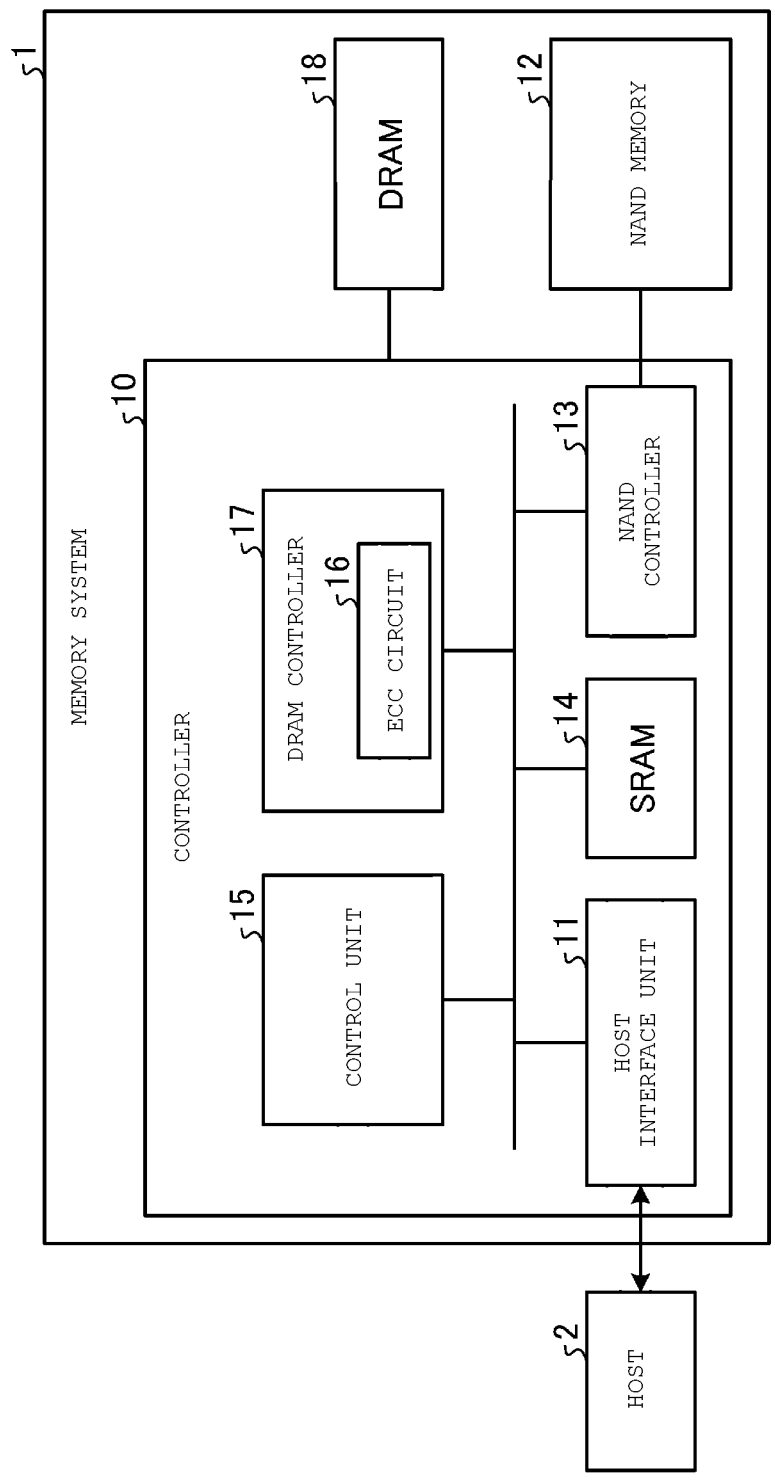
FIG. 1 is a diagram showing an example of a configuration of a memory system according to a first embodiment.

FIG. 1 is a diagram showing an example of a configuration of a memory system according to a first embodiment. A memory system 1 is, for example, a solid state drive (SSD). In the following, a case where a NAND type flash memory (hereinafter referred to as a NAND memory) is used as a non-volatile memory will be described as an example.

The memory system 1 is configured to be connectable to a host 2. The host 2 is, for example, a central processing unit (CPU), a personal computer, a portable information device, a digital still camera, a server, or the like. Any interface standard may be adopted as the interface standard for communication between the memory system 1 and the host 2. Two or more hosts 2 may be connected to the memory system 1 at the same time. The host 2 and the memory system 1 may be connected via a network.

The memory system 1 executes data communication with the host 2 according to an access command from the host 2. The access command includes a write command and a read command. The access command includes a logical address. The logical address is location information indicating a location in a logical address space provided by the memory system 1 to the host 2. As the logical address, for example, logical block address (LBA) can be adopted.

The memory system 1 includes a controller 10, a NAND memory 12, and a dynamic random access memory (DRAM) 18. The controller 10 is implemented by a semiconductor chip such as a system-on-a-chip (SoC). The controller 10 accesses the NAND memory 12 according to a request received from the host 2 connected via a host bus. The controller 10 may be implemented by a plurality of chips. Further, the DRAM 18 and the controller 10 may be integrated on the same chip.

The controller 10 includes a host interface unit 11, a NAND controller 13, a static random access memory (SRAM) 14, a control unit 15, and a DRAM controller 17. The DRAM controller 17 includes an error checking and correction (ECC) circuit 16.

The control unit 15 includes, for example, one or more processors. The control unit 15 executes control of the memory system 1 by executing a program stored in a predetermined location in the memory system 1 in advance. The storage location of the program is an optional location. For example, the program is stored in the NAND memory 12 in advance, and loaded into the DRAM 18 when the memory system 1 starts up. The control unit 15 executes the program loaded in the DRAM 18. The memory system 1 is controlled by a plurality of processes. Each process executed by the control unit 15 will be described later.

The function of each portion of the controller 10 may be implemented by the control unit 15 executing a program. Further, the function of each portion of the controller 10 may be implemented by a dedicated hardware circuit.

The host interface unit 11 is an interface circuit for the memory system 1 to communicate with the host 2. For example, the host interface unit 11 executes transfer of information including user data between the host interface unit 11 and the host 2 under control of the control unit 15.

The NAND controller 13 is an interface circuit with respect to accessing the NAND memory 12. The NAND controller 13 executes transfer of information including user data between the NAND controller 13 and the NAND memory 12 under control of the control unit 15. The NAND controller 13 may be configured with the ECC circuit 16 to perform error correction processing related to the user data.

The SRAM 14 is an example of a third memory. The SRAM 14 may be mounted as a circuit in the controller 10. Alternatively, the SRAM 14 can be mounted as a circuit in a package in which the controller 10 is mounted. The SRAM 14 is a volatile memory having a faster access speed than the DRAM 18 but a higher unit price per bit of storage capacity. The SRAM 14 may have a smaller storage capacity than the DRAM 18.

The DRAM controller 17 is an interface circuit with respect to accessing the DRAM 18. The DRAM controller 17 executes transfer of information including address translation information between the DRAM controller 17 and the DRAM 18 under control of the control unit 15.

The ECC circuit 16 executes coding for error correction with respect to the information to be stored in the DRAM 18 and executes error correction with respect to the information read from the DRAM 18. The ECC circuit 16 may be disposed outside the DRAM controller 17.

The NAND memory 12 is an example of a first memory. The NAND memory 12 is a non-volatile storage. The NAND memory 12 may be implemented by one or more chips.

In the chip of the NAND memory 12, the data storage area includes a plurality of blocks. Each block includes a plurality of pages. A page is a unit in which data can be written and read. A block is the smallest unit in which data can be erased all at once. One block includes n (n is a natural number) pages.

Physical location information (physical address) is assigned to a unit smaller than one page. Here, the unit to which the physical address is assigned is referred to as a cluster. The size of one cluster may be equal to or different from the minimum access unit (for example, sector) from the host 2.

The DRAM 18 is an example of a second memory. The DRAM 18 may be implemented and mounted as a volatile memory package. The DRAM 18 is a volatile memory having a slower access speed than the SRAM 14 in the controller 10 but a lower unit price per bit of storage capacity. The DRAM 18 may have a larger storage capacity than the SRAM 14.

Figure 2:
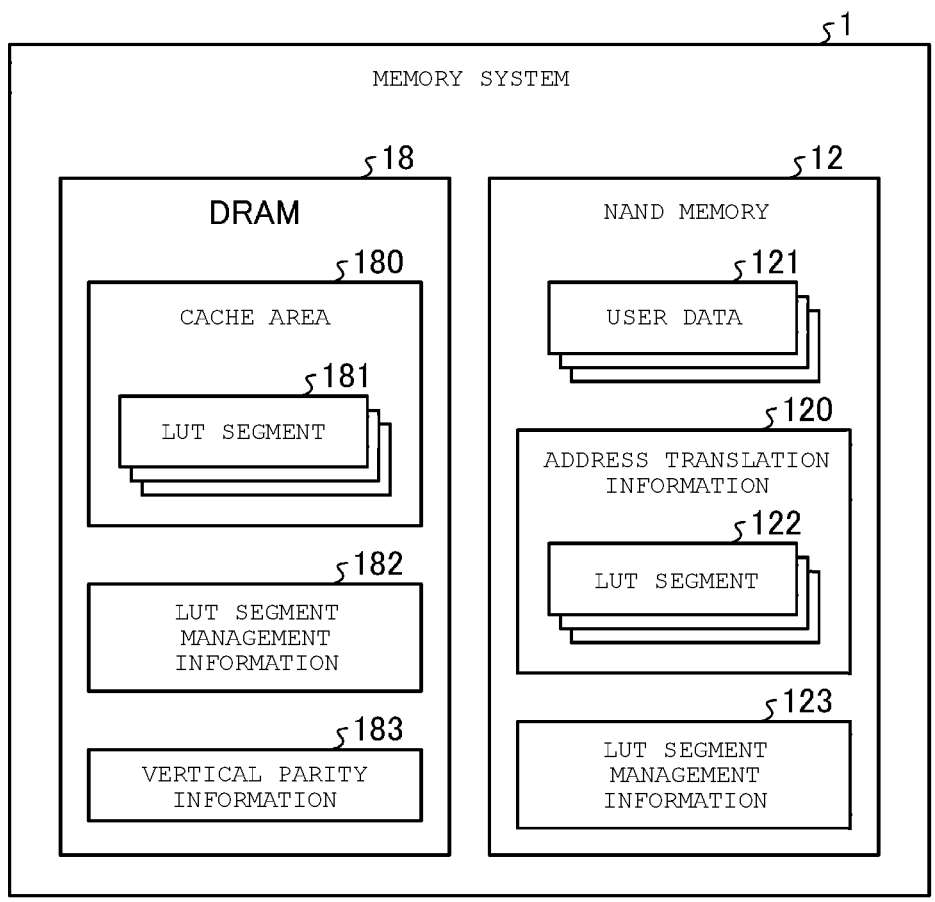
FIG. 2 is a diagram showing various information stored in the memory system according to the first embodiment.

FIG. 2 is a diagram showing various information stored in the memory system 1. A plurality of pieces of user data 121 are stored in the NAND memory 12. Each user data 121 is data requested to be written from the host 2. It is assumed that each user data 121 has the same size as the size of one cluster. Further, the NAND memory 12 stores a plurality of LUT segments 122 and LUT segment management information 123. The LUT segment 122 includes address translation information 120.

The address translation information 120 is information for correlating a logical address with location information indicating a location in the NAND memory 12. The location information indicating a location in the NAND memory 12 is referred to as a physical address. The correspondence relation between the logical address and the physical address is recorded in the address translation information 120 in units of clusters. That is, the address translation information 120 is a group of mapping information indicating the correspondence relation between the logical address value and the physical address value related to one cluster for at least all the logical addresses in use in the logical address space.

The mapping information is updated when the user data 121 is written in the NAND memory 12, and is referred to when the user data 121 is read from the NAND memory 12.

For example, the controller 10 stores first user data 121 in a first location in the NAND memory 12. The controller 10 generates mapping information to correlate the logical address value (referred to as a first logical address value) specified at the time of writing the first user data 121 with the physical address value indicating the first location. Thereafter, when the host 2 requests to write second user data 121 by specifying the logical address value that is the same as the first logical address value, the controller 10 stores the second user data 121 in a second location different from the first location. At this time, the controller 10 updates the mapping information related to the first logical address. That is, the controller 10 updates the mapping information related to the first logical address from the content correlated with the physical address value indicating the first location to the content correlated with the physical address value indicating the second location.

When the controller 10 receives a request from the host 2 to read the user data 121 by specifying a certain logical address value (referred to as a second logical address value), the controller 10 determines the physical address value correlated with the second logical address value by referring to the mapping information related to the second logical address value. Then, the controller 10 reads the user data 121 from the location indicated by the determined physical address value.

Access to the NAND memory 12 takes a relatively long time. Accordingly, when the controller 10 directly refers to or updates the address translation information 120 stored in the NAND memory 12 each time a write or read request is made from the host 2, the time required for the operation requested by the host 2 becomes longer. In the first embodiment, a portion or all of the address translation information 120 is cached in the DRAM 18, and the address translation information 120 cached in the DRAM 18 is referenced or updated. Specifically, the controller 10 allocates a cache area 180 in the DRAM 18, and stores the mapping information of a portion or all of the address translation information 120 in the cache area 180. The cache area 180 of the DRAM 18 is an example of a first area. The controller 10 executes the storage of the mapping information in the cache area 180 and the write-back of the mapping information from the cache area 180 to the NAND memory 12 in units of a group that includes a plurality of pieces of mapping information. Each LUT segment 122 contains a plurality of pieces of mapping information corresponding to this group. That is, the controller 10 manages a plurality of pieces of mapping information in units of the LUT segment 122.

It is assumed that the address translation information 120 is configured in the data format of the look-up table (LUT). That is, in the address translation information 120, the correspondence relation between a logical address and a physical address is recorded in the data format in which the mapping information is recorded in the order of the logical address. Accordingly, each LUT segment 122 includes the mapping information of a plurality of clusters having consecutive logical addresses. Hereinafter, the LUT segment 122 in the cache area 180 will be referred to as an LUT segment 181.

The LUT segment management information 123 is information for managing the storage location of each LUT segment 122. That is, the LUT segment management information 123 is information for managing which location in the NAND memory 12 or in the cache area 180 each LUT segment 122 is stored. Similar to the LUT segment 122, the controller 10 stores the LUT segment management information 123 in the DRAM 18, and refers to or updates the LUT segment management information 123 in the DRAM 18. Hereinafter, the LUT segment management information 123 in the DRAM 18 will be referred to as LUT segment management information 182.

The controller 10 further manages the location at which each LUT segment 122 is cached in the cache area 180 by using the LUT segment management information 182.

Figure 3:
FIG. 3 is a diagram showing a data structure of look-up-table (LUT) segment management information according to the first embodiment.

FIG. 3 is a schematic diagram showing an example of the data structure of the LUT segment management information 182 according to the embodiment. As shown in this figure, the LUT segment management information 182 is a table which includes an LUT segment number, an index, and a NAND address for each LUT segment 122.

The LUT segment number is data that identifies the LUT segment 122, and is unique data for each LUT segment 122. The index is information indicating the storage location of the LUT segment 122 in the cache area 180 when the LUT segment 122 indicated by the LUT segment number is stored in the cache area 180. The index represents, for example, the location in the cache area 180 by an offset from the head of the cache area 180. The method of representing the location in the cache area 180 is not limited thereto. The location in the cache area 180 may be represented using the address information mapped to the DRAM 18. The NAND address is a physical address value indicating the storage location of the LUT segment 122 in the NAND memory 12 when the LUT segment 122 indicated by the LUT segment number is stored in the NAND memory 12.

The data structure of the LUT segment management information 123 and the data structure of the LUT segment management information 182 may be different from each other. For example, the LUT segment management information 123 does not have to include information representing the storage location of the LUT segment 122 in the cache area 180 (that is, an index).

In general, the larger the amount of cached mapping information, the higher the cache hit rate, so that the performance of the memory system is improved. Accordingly, there is a desire to cache as much mapping information as possible. On the other hand, there is a desire to reduce the capacity of the DRAM mounted in the memory system from the viewpoint of mounting area, wiring, or cost.

To meet these conflicting demands, in the first embodiment, a plurality of pieces of mapping information is disposed in each LUT segment 122 so that the amount of mapping information recorded in each LUT segment 122 of a predetermined size is as large as possible. Accordingly, the amount of mapping information cached in the DRAM 18 can be increased. As a result, it is possible to reduce the capacity of the DRAM 18 and improve the performance at the same time.

Hereinafter, one piece of mapping information recorded in one LUT segment 122 (and one LUT segment 181) may be referred to as an entry.

Figure 4:
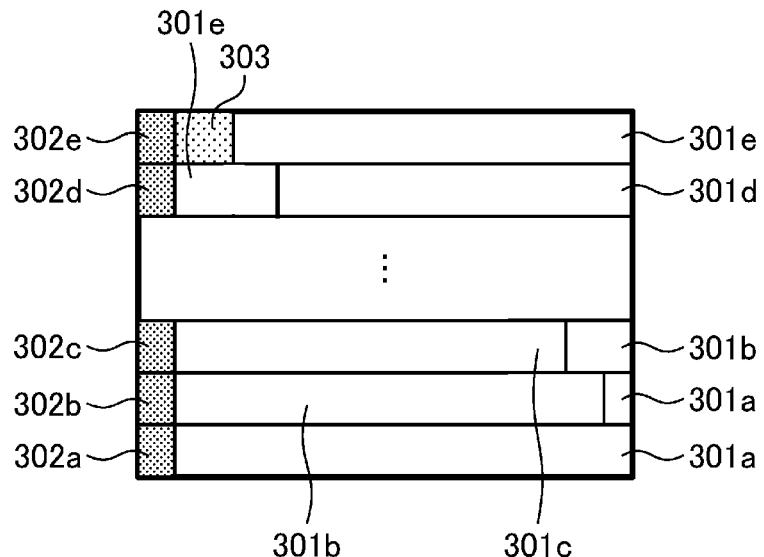
FIG. 4 is a diagram showing an example of an LUT segment according to the first embodiment.

FIG. 4 is a diagram showing an example of the data structure of the LUT segment 122 or 181 according to the first embodiment. In this figure, the data structure of the LUT segment 181 cached in the cache area 180 will be described. This data structure is the same as the data structure of the LUT segment 122.

In the example of FIG. 4, the size of one LUT segment 181 is, for example, 256 bytes (4 bytes×64). The 4 bytes in one horizontal line in FIG. 4 correspond to the width of data transfer between the DRAM 18 and the controller 10. The width of data transfer between the DRAM 18 and the controller 10 is not limited thereto.

As shown in FIG. 4, the LUT segment 181 includes a plurality of entries such as an entry 301a to an entry 301e, a correction bit such as a correction bit 302a to a correction bit 302e, and a reserved area 303. The reserved area 303 is an area in which neither the correction bit nor the entry is disposed. The size of one entry is 32 bits. The size of the correction bit is 1 bit.

As shown in FIG. 4, the LUT segment 181 includes a horizontal parity, which is a correction bit, for each 4-byte piece of information. The 4-byte information including this horizontal parity is referred to as unit information. That is, in the example shown in FIG. 4, one LUT segment includes 64 pieces of unit information.

The horizontal parity is generated by the ECC circuit 16. The ECC circuit 16 further generates a vertical parity based on 64 pieces of unit information and stores the vertical parity in the DRAM 18 as vertical parity information 183. When the LUT segment 181 is read from the DRAM 18, the ECC circuit 16 executes error correction for the LUT segment 181 based on the group of the horizontal parities included in the LUT segment 181 and the vertical parity information 183 corresponding to the LUT segment 181.

In the example of this figure, the size of the unit information is equal to the width of data transfer between the DRAM 18 and the controller 10. However, the size of the unit information does not have to be equal to the width of the data transfer between the DRAM 18 and the controller 10.

In the embodiment, as an example, it is assumed that a plurality of physical addresses corresponding to consecutive logical addresses are recorded in one LUT segment 181 in the order of the logical addresses. That is, the physical address value is recorded in each entry. For example, the physical address value corresponding to a certain logical address value $Adr\_i$ is recorded in an entry i, and the physical address value corresponding to a logical address value $Adr\_i+1$ following the logical address value $Adr\_i$ is recorded in an entry i+1. The data structure of each entry is not limited thereto. For each entry, the logical address value and the physical address value may be recorded as a pair.

The length of the bit string indicating the physical address value depends on the user capacity. The larger the user capacity, the longer the length of the bit string indicating the physical address value. In the example shown in FIG. 4, the length of the bit string indicating the physical address value is 32 bits, which is longer than 31 bits. That is, the length of the bit string indicating the physical address value does not match 31 (4 bytes×8−1) bits and is longer than 31 bits. Accordingly, one entry is divided into two pieces of unit information and disposed.

In the LUT segment 181, two entries related to two consecutive logical address values are disposed on the DRAM 18 to be adjacent to each other. That is, a plurality of entries are sequentially disposed so that there is no space between the end of the area in which one entry is disposed and the head of the area in which the subsequent entry is disposed. Accordingly, many entries are disposed without a gap in the portion of the 64 pieces of unit information excluding the horizontal parity. Then, in the first embodiment, as a result of many entries being disposed without a gap in the portion of the 64 pieces of unit information excluding the horizontal parity, there is a reserved area 303 less than the size of one entry at the end of the unit information.

Here, an example of the LUT segment of a comparative example will be described. According to the LUT segment of the comparative example, the unit information is configured in units of an integral multiple of 1 byte, and one piece of unit information includes only one entry. Accordingly, for example, when the length of the bit string indicating the physical address value does not match the (N bytes×8−1) bits, each unit information includes a reserved area. One LUT segment has a reserved area for each unit information, and the total size of the reserved areas included in one LUT segment is larger than the size of the first embodiment. Accordingly, the amount of mapping information stored in one LUT segment of the comparative example is smaller than the amount of mapping information stored in one LUT segment of the first embodiment.

On the other hand, according to the first embodiment, a plurality of entries are sequentially disposed such that there is no space between the end of an area in which one entry is disposed and the head of an area in which the subsequent entry is disposed. Accordingly, although the length of the bit string indicating the physical address value does not match (N bytes×8−1) bits, the reserved area for each unit information is not necessary. Accordingly, it is possible to increase the amount of mapping information stored in one LUT segment relative to the comparative example. Accordingly, according to the first embodiment, the amount of mapping information that can be cached in the cache area of a predetermined size is large relative to the comparative example. That is, according to the first embodiment, the address translation information 120 can be efficiently cached in the cache area 180.

Next, a processing procedure of an LUT segment will be described with reference to FIGS. 5 to 7.

Figure 5:
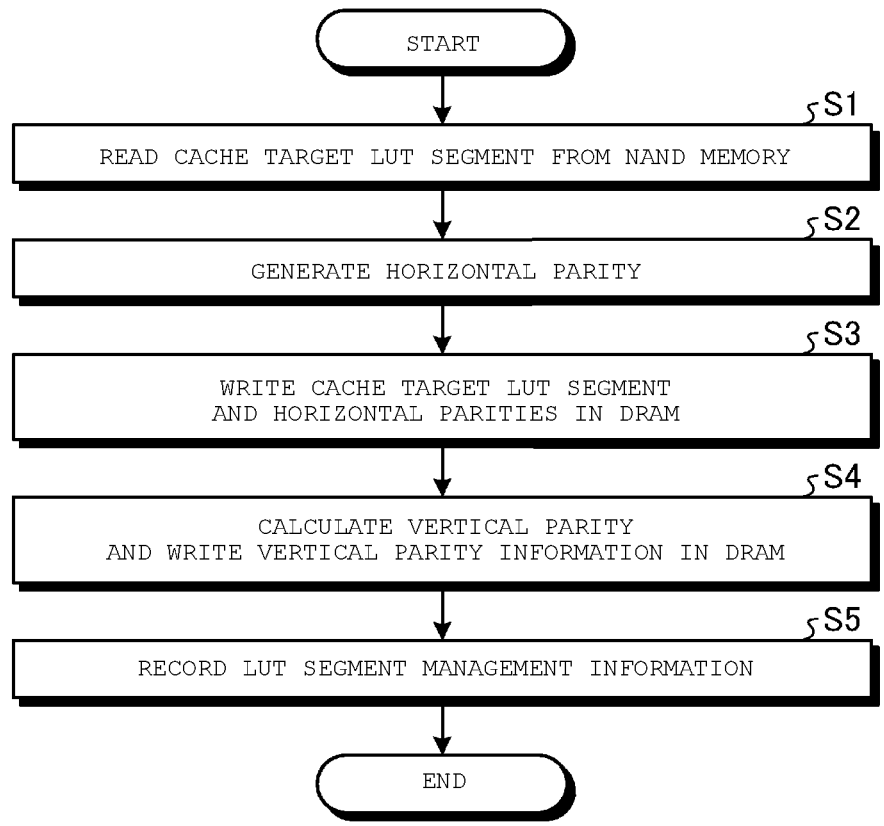
FIG. 5 is a flowchart showing a processing procedure for writing the LUT segment to a DRAM according to the first embodiment.

FIG. 5 is a flowchart showing a processing procedure for writing an LUT segment 122 to the DRAM 18. The control unit 15 of the controller 10 reads an LUT segment 122 (referred to as a cache target LUT segment) stored in the NAND memory 12 at a predetermined timing (for example, when a cache miss occurs) (step S1).

Subsequently, the ECC circuit 16 generates the horizontal parity for each unit information from the cache target LUT segment 122 read from the NAND memory 12 (step S2). Then, the DRAM controller 17 stores the horizontal parity for each unit information and the cache target LUT segment 122 in the cache area 180 of the DRAM 18 as the cache target LUT segment 181 (step S3).

The ECC circuit 16 generates the vertical parity based on all the unit information of the cache target LUT segment 122, and stores the generated vertical parity in the DRAM 18 as the vertical parity information 183 (step S4).

The control unit 15 records an index representing the location of the cache target LUT segment 181 in the cache area 180 in the LUT segment management information 182 (step S5). Then, the processing of writing the LUT segment to the DRAM 18 is ended.

Figure 6:
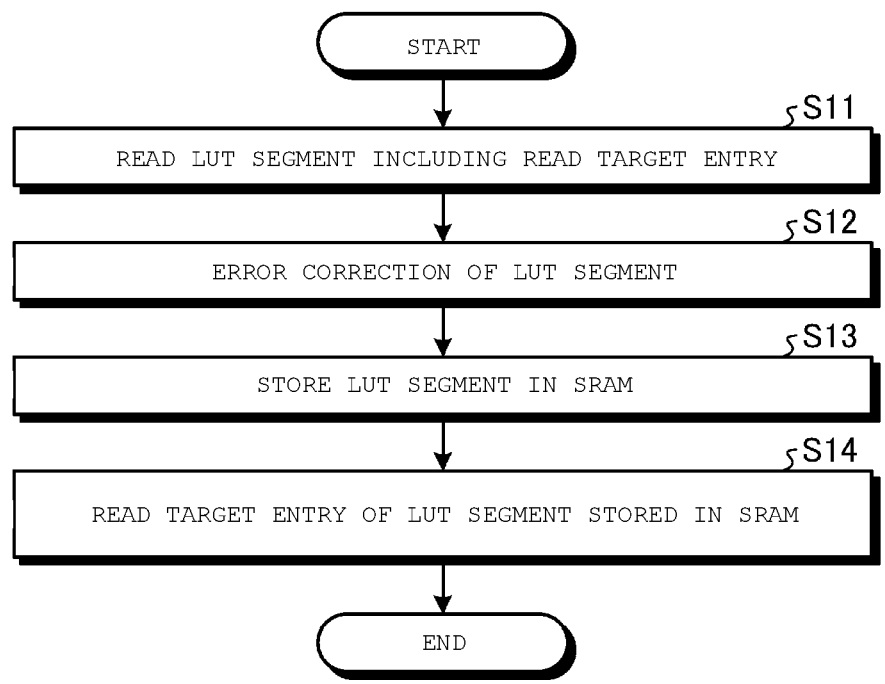
FIG. 6 is a flowchart showing a processing procedure for reading the LUT segment from the DRAM.

FIG. 6 is a flowchart showing a processing procedure for reading an LUT segment 181 from the DRAM 18.

First, the control unit 15 controls the DRAM controller 17 to read an LUT segment 181 including a read target entry (step S11). The read target entry is an entry including the physical address value of read target user data. At this time, the ECC circuit 16 executes error correction with respect to the LUT segment 181 read from the DRAM 18 based on the horizontal parity and the vertical parity information 183 (step S12). The control unit 15 stores the LUT segment 181 after the error correction is executed in the SRAM 14 (step S13). Then, the control unit 15 reads the read target entry in the LUT segment 181 in the SRAM 14 (step S14). Then, the processing of reading the LUT segment 181 from the DRAM 18 is ended.

When the LUT segment 181 including the read target entry is previously stored in the SRAM 14, the controller 10 can omit the processing from the step S11 to the step S13 and execute the processing of the step S14.

Figure 7:
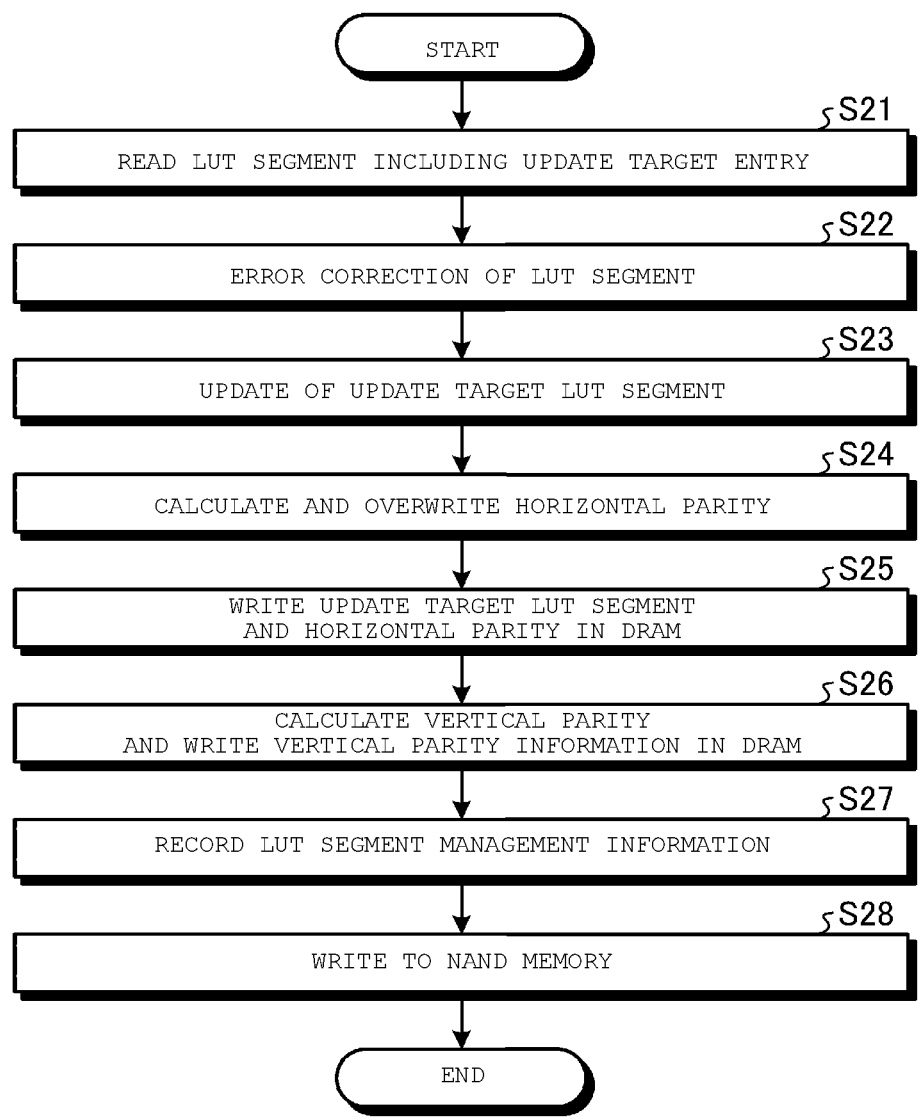
FIG. 7 is a flowchart showing a processing procedure for updating the LUT segment cached in the DRAM.

FIG. 7 is a flowchart showing a processing procedure for updating an LUT segment cached in the DRAM 18.

The control unit 15 of the controller 10 controls the DRAM controller 17 and reads an LUT segment 181 including an update target entry (step S21). The update target entry is an entry including a physical address value of write target user data. At this time, the ECC circuit 16 executes error correction with respect to the LUT segment 181 based on the horizontal parity and the vertical parity information 183 (step S22). The control unit 15 stores the LUT segment 181 after the error correction is executed in the SRAM 14. Then, the control unit 15 updates the update target LUT segment 181 that is the LUT segment 181 including the update target entry in the SRAM 14 (step S23).

The controller 10 executes the processing after step S24 when, for example, a free space of the SRAM 14 becomes small. The ECC circuit 16 generates the horizontal parity for each unit information from the update target LUT segment 181. The ECC circuit 16 overwrites the generated horizontal parity to the corresponding correction bit of the update target LUT segment 181 (step S24). The DRAM controller 17 stores the overwritten horizontal parity and the update target LUT segment 181 in the cache area 180 of the DRAM 18 (step S25). The ECC circuit 16 generates the vertical parity based on all the unit information of the update target LUT segment 181, and stores the generated vertical parity in the DRAM 18 as the vertical parity information 183 (step S26). The control unit 15 records information related to the location of the update target LUT segment 181 in the LUT segment management information 182 (step S27). In addition, when the memory system 1 is shut down, the control unit 15 writes the update target LUT segment 181 to the NAND memory 12 (step S28).

As described above, according to the first embodiment, the control unit 15 uses the LUT segment 181 in which a plurality of entries are sequentially disposed so that there is no space between the end of an area in which one entry is disposed and the head of an area in which the subsequent entry is disposed. Accordingly, although the length of the bit string indicating the physical address value does not match (N bytes×8−1) bits, there is no reserved area for each unit information according to the first embodiment. Accordingly, it is possible to increase the amount of mapping information stored in one LUT segment of the first embodiment with respect to the size of the LUT segment relative to the comparative example described above. As a result, according to the first embodiment, the amount of mapping information that can be cached in the cache area of a predetermined size is large relative to the comparative example. That is, according to the first embodiment, the address translation information 120 can be efficiently cached in the cache area 180.

Further, according to the first embodiment, the DRAM 18 stores the LUT segment management information 182 indicating the location of each LUT segment. As described above, since the amount of mapping information included in one LUT segment can be increased, the number of LUT segments can be reduced. As a result, the size of the LUT segment management information 182 temporarily stored in the DRAM 18 also can be reduced. Accordingly, the capacity of the DRAM 18 to be mounted in the memory system 1 can be reduced, and as a result, the cost of the memory system 1 can be reduced.

Further, the controller 10 copies the LUT segment 181 from the DRAM 18 to the SRAM 14, updates an entry of the LUT segment 181, and stores the updated LUT segment 181 in the DRAM 18. As described above, since the LUT segment 181 stores more entries, the memory system 1 can reduce the number of LUT segments 181 to be stored in the SRAM 14.

Further, the controller 10 stores the LUT segment 181 from the DRAM 18 into the NAND memory 12 in units of LUT segments. As described above, since the LUT segment 181 stores more entries, the memory system 1 can reduce the number of LUT segments 181 to be stored to the NAND memory 12 from the DRAM 18 and can reduce the processing load.

Second Embodiment

In a second embodiment, processing of storing a plurality of entries is controlled based on an error correction frame. For example, to perform error correction processing on the DRAM 18, the error correction frame including a plurality of entries is generated. The error correction frame has a size of, for example, 64 bytes (512 bits), of which 19 bits are an ECC parity. In the present embodiment, one LUT segment has a size of 256 bytes. This LUT segment of 256 bytes includes a reserved area as described in the first embodiment.

Consider storing a plurality of entries in one error correction frame. When the size of the error correction frame other than the ECC parity is not an integral multiple of the entry size, a reserved area is necessary in the error correction frame.

Here, as a method of storing more entries in one error correction frame, a method can be considered in which one error correction frame stores a plurality of entries included in a plurality of LUT segments (hereinafter referred to as a "packed" method).

Figure 8:
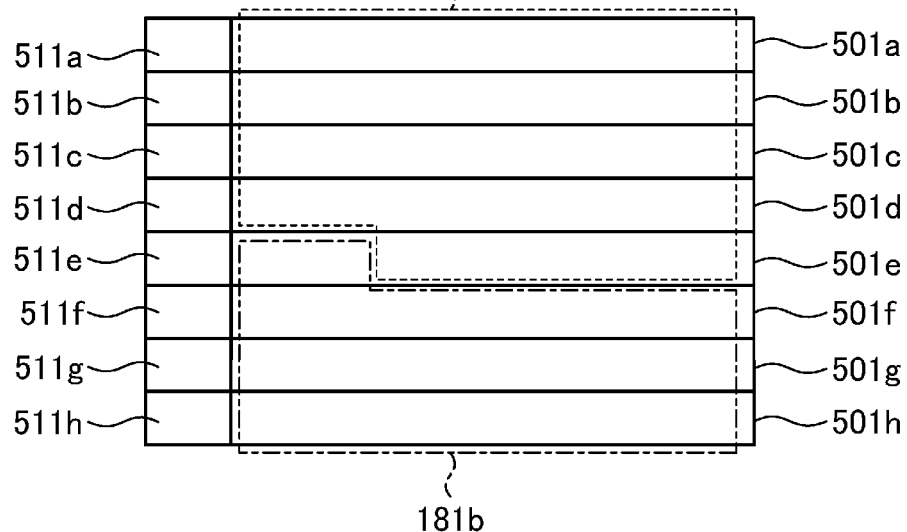
FIG. 8 is a diagram showing a configuration example of an error correction frame of a "packed" method according to a second embodiment.

For example, as shown in FIG. 8, it is assumed that error correction frames 501a to 501h are stored in the DRAM 18. The error correction frames 501a to 501d store a portion of an LUT segment 181a and also store ECC parities 511a to 511d, respectively. The error correction frame 501e stores the other portion of the LUT segment 181a, a portion of an LUT segment 181b, and an ECC parity 511e. The error correction frames 501f to 501h store the other portion of the LUT segment 181b and also store ECC parities 511f to 511h, respectively.

Alternatively, a method can be also considered in which a plurality of entries are stored in one error correction frame so that the head of an LUT segment is aligned with the head of an error correction frame (hereinafter referred to as a "aligned" method). In this case, since the head of the LUT segment is aligned with the head of the error correction frame, a reserved area is necessary in an error correction frame. In the "aligned" method, since one error correction frame does not store a plurality of LUT segments, processing of storing or reading the LUT segment can be simplified as compared with the "packed" method.

Figure 9:
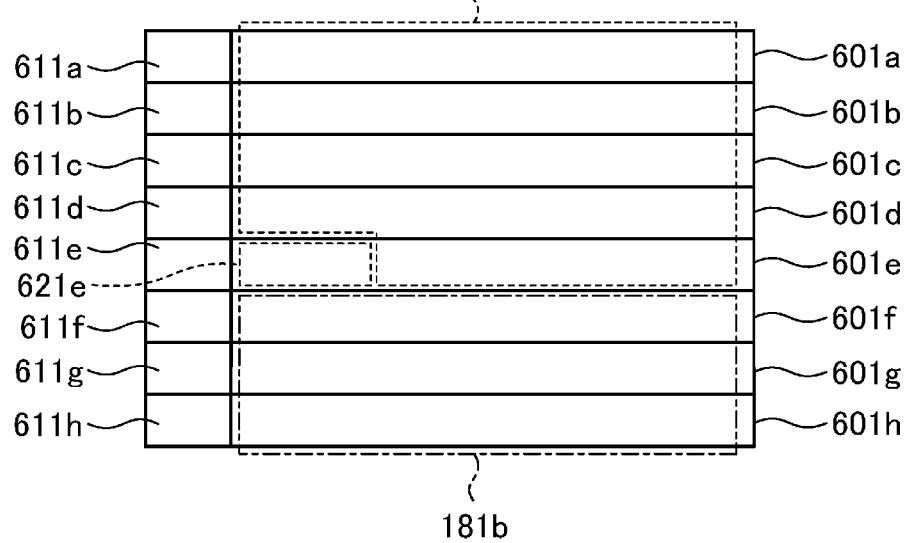
FIG. 9 is a diagram showing a configuration example of an error correction frame of an "aligned" method according to the second embodiment.

For example, as shown in FIG. 9, it is assumed that error correction frames 601a to 601h are stored in the DRAM 18. The error correction frames 601a to 601d store a portion of an LUT segment 181a and also store ECC parities 611a to 611d, respectively. The error correction frame 601e stores the other portion of the LUT segment 181a, a reserved area 621e, and an ECC parity 611e. The error correction frames 601f to 601h store a portion of an LUT segment 181b and also store ECC parities 611f to 611h, respectively. The head of the LUT segment 181b is aligned with the head of the error correction frame 601f.

In the case of the "packed" method shown in FIG. 8, since the error correction frame 501e does not have a reserved area, more entries can be stored in a predetermined area as compared with the "aligned" method shown in FIG. 9.

For example, when the size of the area is limited as in the cache area 180 of the DRAM 18, the "packed" method is applied to use the area efficiently, and when the LUT segment is stored in the NAND memory 12, the method may be converted to the "aligned" method and stored.

A processing procedure of converting an LUT segment stored in the DRAM 18 by the "packed" method into the "aligned" method and storing the LUT segment in the NAND memory 12 will be described with reference to FIGS. 10 and 11.

Figure 10:
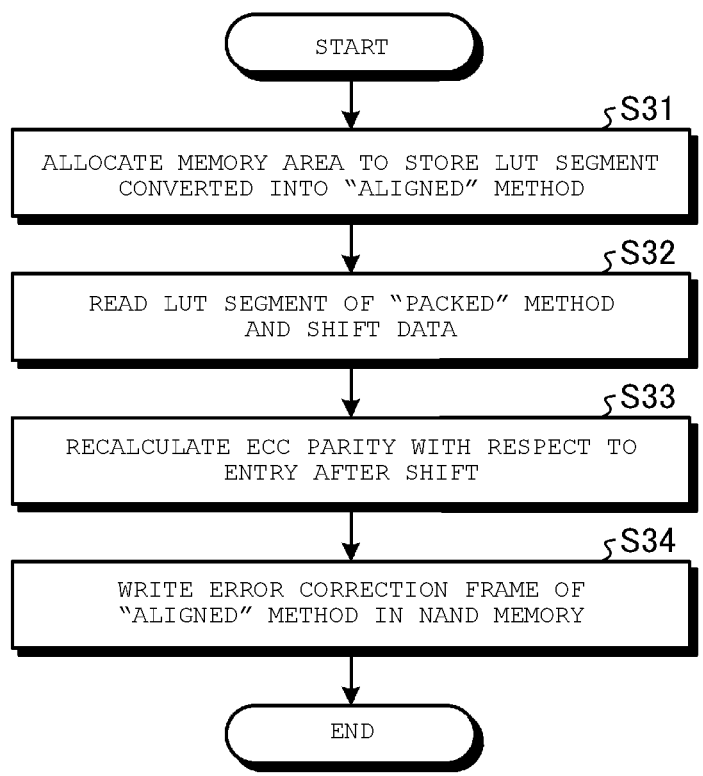
FIG. 10 is a flowchart showing a processing procedure of an LUT segment according to the second embodiment.

FIG. 10 is a flowchart showing a processing procedure of an LUT segment according to the second embodiment. First, the control unit 15 allocates a memory area on the DRAM 18 to temporarily store an LUT segment after the LUT segment is converted into the "aligned" method (step S31). Then, the control unit 15 reads the LUT segment stored in the "packed" method and shifts the data of the LUT segment (step S32).

Figure 11A:
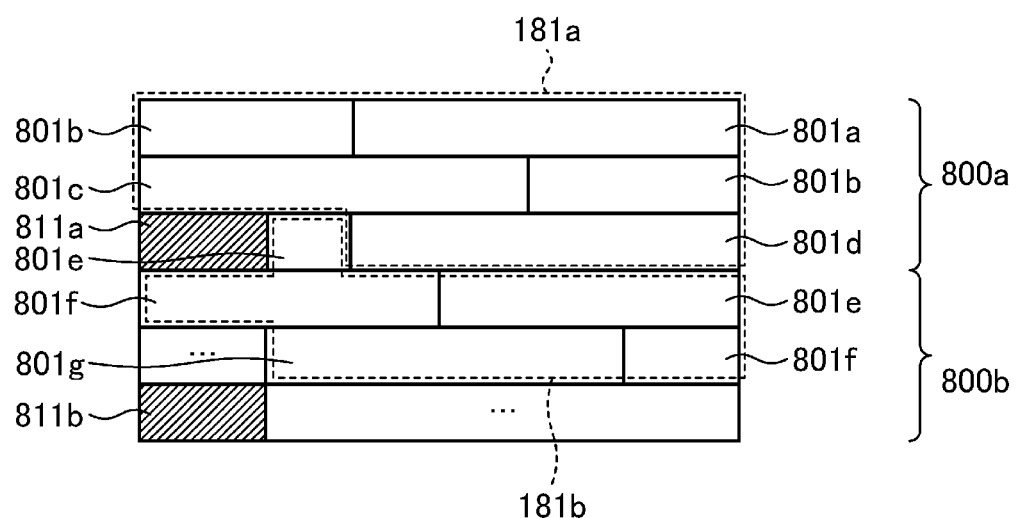
FIG. 11A is a diagram showing an example of an error correction frame of the "packed" method, according to the second embodiment.

Here, an example of converting from the "packed" method to the "aligned" method will be described with reference to FIGS. 11A and 11B. FIG. 11A shows two error correction frames 800a and 800b stored in the DRAM 18 in the "packed" method. As shown in FIG. 11A, in the case of the "packed" method, the error correction frame 800a stores entries 801a to 801d, a portion of an entry 801e, and an ECC parity 811a. The entries 801a to 801d belong to the LUT segment 181a. The entry 801e belongs to the LUT segment 181b. The entry 801e is the head entry of the LUT segment 181b. The error correction frame 800b stores the other portion of the entry 801e, entries 801f to 801g, and an ECC parity 811b. The entries 801f to 801g belong to the LUT segment 181b.

Figure 11B:
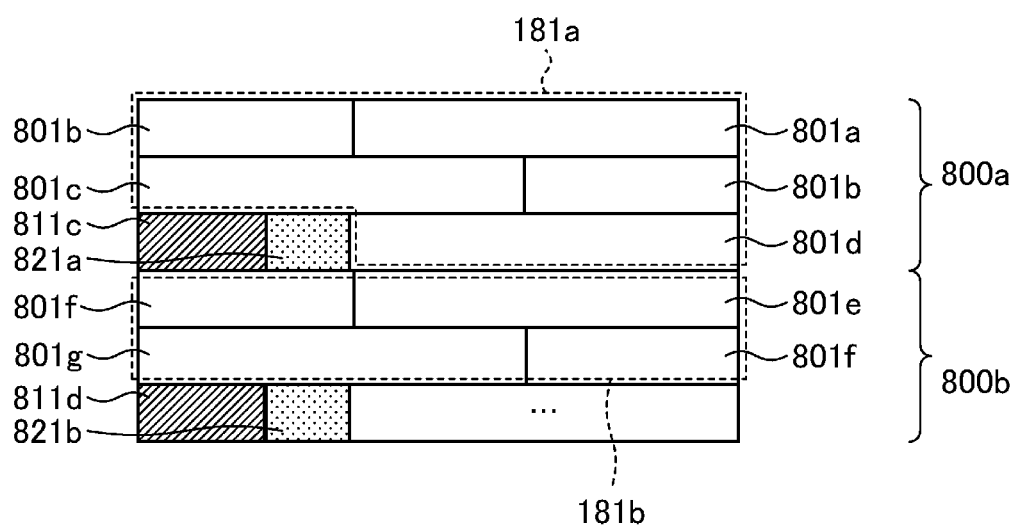
FIG. 11B is a diagram showing an example of an error correction frame of the "aligned" method according to the second embodiment.

FIG. 11B shows two error correction frames 800a and 800b temporarily stored in the DRAM 18 in the "aligned" method. The control unit 15 shifts the data of the entry 801e and aligns the head of the error correction frame 800b with the head of the entry 801e (that is, the head of the LUT segment 181b) to perform conversion to the "aligned" method. As a result, the error correction frame 800a includes the entries 801a to 801d, a reserved area 821a, and an ECC parity 811c. The ECC parity 811c is an ECC parity recalculated based on the data of the entries 801a to 801d. The error correction frame 800b includes the entries 801e to 801g, a reserved area 821b, and an ECC parity 811d. The ECC parity 811d is an ECC parity recalculated based on the data of the entries 801e to 80g.

Return to FIG. 10. The ECC circuit 16 recalculates the ECC parity based on the data of the entries stored in the error correction frame after the shift (step S33). The control unit 15 writes the error correction frame of the "aligned" method generated based on the shifted entry and the recalculated ECC parity, in the NAND memory 12 (step S34).

Figure 12:
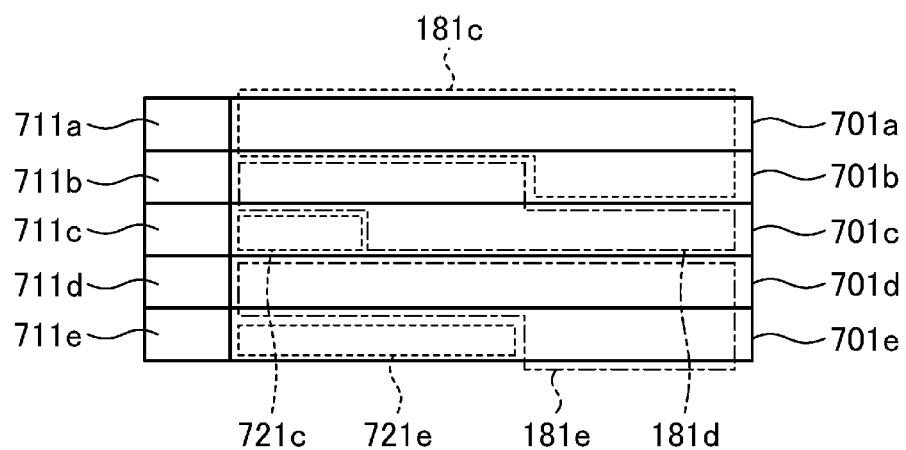
FIG. 12 is a diagram showing a configuration example of an error correction frame of a "mixed" method according to the second embodiment.

Although the "packed" method and the "aligned" method have been described above, a "mixed" method in which these methods are combined may be employed. For example, as shown in FIG. 12, the "packed" method may be employed for an error correction frame 701a and an error correction frame 701b. In this case, the error correction frame 701a includes a portion of an LUT segment 181c and an ECC parity 711a. The error correction frame 701b includes the other portion of the LUT segment 181c, a portion of an LUT segment 181d, and an ECC parity 711b. Further, the "aligned" method may be employed for error correction frames 701c to 701e. In this case, the error correction frame 701c includes the other portion of the LUT segment 181d, a reserved area 721c, and an ECC parity 711c. The error correction frame 701d includes a portion of an LUT segment 181e and an ECC parity 711d. The error correction frame 701e includes the other portion of the LUT segment 181e, a reserved area 721e, and an ECC parity 711e.

In the embodiment described above, the controller 10 stores the entries in the DRAM 18 without leaving a space between one entry and the subsequent entry. In this case, the controller 10 can store more entries in the DRAM 18.

Further, in the case of the "packed" method, the controller 10 stores the LUT segment in the DRAM 18 without aligning the head of the error correction frame with the head of the LUT segment. In this case, the controller 10 can store more LUT segments in the DRAM 18.

Further, in the case of the "aligned" method, the controller 10 does not store a plurality of LUT segments in one error correction frame. Accordingly, the processing of storing or reading the LUT segment can be simplified.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system configured to be connected to a host, comprising:
    a first memory that is a non-volatile memory;
    a second memory; and
    a controller configured to manage cache data stored in the second memory in units of a segment such that each segment includes a plurality of pieces of the cache data, wherein
    each of the plurality of pieces of the cache data includes mapping information which correlates a logical address value indicating a location in a logical address space provided by the memory system to the host with a location in the first memory, and at least two pieces of the cache data are arranged in one segment without a space therebetween.

2. The memory system according to claim 1, wherein
    the controller is further configured to transfer the one segment between the controller and the second memory in units of a first size that is smaller than a size of the one segment, and at least a portion of the one segment having a size equal to the first size includes at least two pieces of the cache data that are arranged in said portion without a space therebetween.

3. The memory system according to claim 1, wherein
    the controller is further configured to store information indicating a location of each of the plurality of pieces of the cache data in the second memory.

4. The memory system according to claim 1, further comprising a third memory, wherein
    the controller is further configured to copy the cache data from the second memory to the third memory, update the mapping information included in the cache data stored in the third memory, and store the cache data including the updated mapping information in the second memory.

5. The memory system according to claim 4, wherein the second memory has faster access speeds than the first memory, and the third memory has faster access speeds than the second memory.

6. The memory system according to claim 1, wherein
    the controller is further configured to store the plurality of pieces of the cache data from the second memory into the first memory in units of the segment.

7. The memory system according to claim 1, wherein
    the controller is further configured to store a plurality of segments of the cache data in a plurality of error correction frames respectively, in the second memory, and execute error correction with respect to each of the plurality of error correction frames by using a parity included in each of the plurality of error correction frames.

8. The memory system according to claim 7, wherein
    none of the plurality of pieces of the cache data is stored across two error correction frames.

9. The memory system according to claim 7, wherein
    one of the plurality of pieces of the cache data is stored across two error correction frames.

10. The memory system according to claim 9, wherein
    the controller is further configured to read the two error correction frames from the second memory, reconfigure the two error correction frames so that none of the plurality of pieces of the cache data is stored across two error correction frames, and store the reconfigured two error correction frames in the first memory.

11. A method of managing cache data in units of a segment that includes a plurality of pieces of the cache data, wherein each of the plurality of pieces of the cache data includes mapping information which correlates a logical address value indicating a location in a logical address space with a location in a first memory that is a non-volatile memory, said method comprising:

storing a segment of the cache data in a second memory, wherein at least two pieces of the cache data are arranged in the segment without a space therebetween.

12. The method according to claim 11, further comprising:

transferring the segment into and out of the second memory in units of a first size that is smaller than a size of the segment, and at least a portion of the segment having a size equal to the first size includes at least two pieces of the cache data that are arranged in said portion without a space therebetween.

13. The method according to claim 11, further comprising:

storing information indicating a location of each of the plurality of pieces of the cache data in the second memory.

14. The method according to claim 11, further comprising:

copying the cache data that has been stored in the second memory to a third memory;

updating the mapping information included in the cache data stored in the third memory; and storing the cache data including the updated mapping information in the second memory.

15. The method according to claim 14, wherein the second memory has faster access speeds than the first memory, and the third memory has faster access speeds than the second memory.

16. The method according to claim 11, further comprising:

storing the plurality of pieces of the cache data from the second memory into the first memory in units of the segment.

17. The method according to claim 11, further comprising:

storing a plurality of segments of the cache data in a plurality of error correction frames respectively, in the second memory; and executing error correction with respect to each of the plurality of error correction frames by using a parity included in each of the plurality of error correction frames.

18. The method according to claim 17, wherein none of the plurality of pieces of the cache data is stored across two error correction frames.

19. The method according to claim 17, wherein one of the plurality of pieces of the cache data is stored across two error correction frames.

20. The method according to claim 19, further comprising:

reading the two error correction frames from the second memory;

reconfiguring the two error correction frames so that none of the plurality of pieces of the cache data is stored across two error correction frames; and storing the reconfigured two error correction frames in the first memory.

* * * * *